Patented June 23, 1931

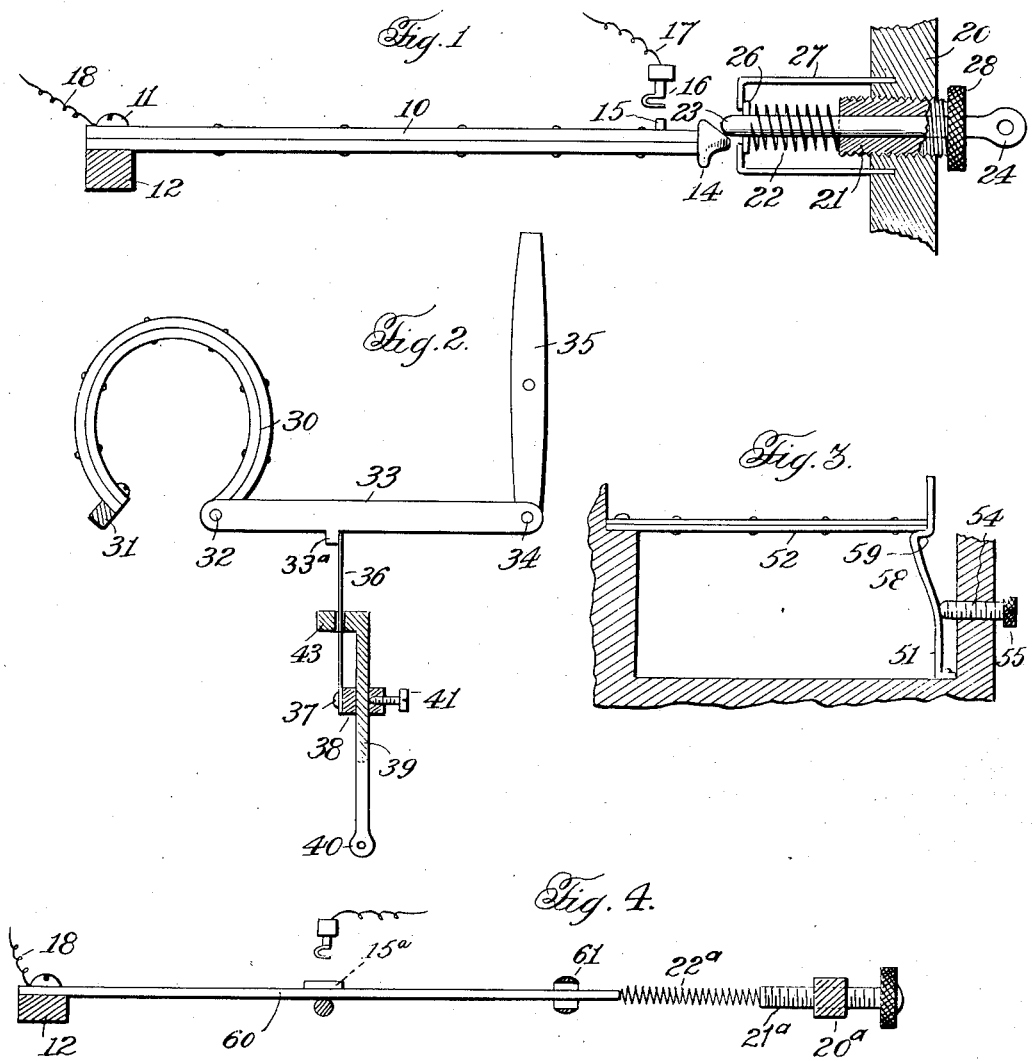

1,811,442

UNITED STATES PATENT OFFICE

WALTER O. SNELLING, OF ALLENTOWN, PENNSYLVANIA

THERMOSTAT

Application filed November 3, 1925. Serial No. 66,674.

This invention relates to thermostats in general and more particularly to thermostats which act with a snap such for example as those used in connection with electrical devices where it is desired to avoid arcing during the making and breaking of the circuits.

The principal object of the present invention lies in the provision of an effective snap switch of simple construction. A further object lies in the provision of a bimetallic thermostat in combination with a resistant element which prevents the bimetallic bar from moving its free end under the influence of slight changes in temperature, but which resistance will yield at a predetermined application of force allowing the thermostat bar to snap forward upon reaching a chosen temperature.

A still further object of the present invention concerns improvements upon thermostat plates of the dented type, such for example as illustrated in Spencer Patent #1,448,240, March 13, 1923, in that provision is made for altering at will the temperature at which the thermostat element will snap to circuit opening position as the iron becomes heated to a high temperature.

Figure 1 is a diagrammatic view of a simple form of the invention.

Figure 2 illustrates a modification in which the thermostat moves a lever.

Figure 3 shows a further modification, particularly applicable to a household iron.

Figure 4 shows a modification of the invention in which the bar is not bi-metallic.

Experiments have shown that if we notch the free end of a straight bimetallic bar of the usual construction wherein the two members have different rates of expansion under heat and fit a rounded adjustable tension member into the notch, the bar will distort until the accumulated tension is sufficiently great to overcome the resistance offered by the holding of the free end of the bar and will then snap to the position to which it would have moved had there been no resistance to free movement.

In such a structure a very simple manner of controlling the tension is by a spring with one end adjustable and the other end engaging the rounded member. Such a spring can be made to hold the free end of the thermostat to any temperature ordinarily desired, and then when the critical point is reached and the accumulated tension overcomes the spring resistance the thermostat will move with a snap, dispensing in such action all of the accumulated tension, and making the firm, quick contact so highly desired in connection with an electrical switch.

The invention may be applied to a great number of different devices, not only to electric switches but to any mechanical means wherein the thermostat moves a series of mechanisms. By offering resistance to the movement of the free end of the thermostat, whether a straight bar, a loop, a coil, or even a compound thermostat, the range of temperature is greatly increased if the offering of resistance in one direction is allowed to cause resistance in the opposite direction. In some cases this increased range is not desirable, and for these situations the resistance is so designed that it offers a high resistance in one direction but a slight or negligible resistance in the opposite direction, this being particularly desirable in an electric iron, where an increase in range would be objectionable.

It is evident that the thermostat may control a valve, trigger, or switch of any kind and may also include signal mechanism indicating that certain changes have been made through the thermostat. Such indicating means are not shown in any of the drawings as they are old and of well-known construction and not per se a part of the invention.

In Figure 1, an extremely simple form of thermostat is shown consisting of a bimetallic element 10 of bar construction, anchored at one end as by the screw 11 to a permanent support 12. The free end of the compound bar is provided with a rounded nose 14 and may have near the end a contact point 15 adapted to engage a fixed contact point 16 connected by the wire 17 to an electric circuit the return from which is illustrated as a wire 18 here shown as connected to the fastening means 11. The support 20, which is at a fixed distance from the support 12, is threaded to receive an adjusting screw 21 which forms one abutment for a spring 22, which loosely surrounds the tension head 23 which is provided with an optional handle 24. A collar 26 forms the second abutment for the spring and a small guard 27 may be added to limit the expansion of the spring, particularly to prevent the tension head 23 from blocking movement of the nose 14. Adjustment of the strength of the spring 22 is controlled by the knurled head 28 of the threaded sleeve or screw 21.

The operation of this simple form is practically obvious. The bimetallic bar upon an increase of temperature would warp laterally by reason of the linear expansion of the metal having a higher coefficient if there were no resistance element. Longitudinal expansion is restrained by the other metal, usually steel, and the consequent movement therefore tends to move the bar into arc shape, tangent at the point of support. At the commencement of the movement, however, the nose 14 engages the tension head 23 and since the two ends of the thermostat bar are held, it tends to distort, and this distortion with its consequent accumulation of energy increases until the stored force is sufficient to overcome the strength of the spring 22, at which time the nose rides over the tension head forcing it into the sleeve 21. As soon as the point of the nose has passed the tension head, the spring 22 aids in the further movement of the thermostat and the contact of the electrodes 15 and 16 is consequently a snap engagement with no chance for arcing. In cooling the condition is very much the same, the bar 10 distorts, but the contact between 15 and 16 is maintained until the spring 22 is overcome and the breakage of the current is also performed with a quick sudden snap. The nearer the sleeve 21 is moved toward the support 12, the greater the resistance offered the nose 14 and consequently the greater the temperature difference between off and on positions.

In Figure 2, the thermostat 30 is of the horse shoe type, one end being anchored as at 31 while the other end is pivoted as at 32 to a link 33 having a substantially reciprocating movement and here illustrated as pivoted at its free end as at 34 to a lever 35 which by turning about its pivot at the middle as illustrated may control any sort of mechanism or the lever itself may be the operating member of a quick acting electric snap switch.

The resistance element in this invention is a straight leaf spring 36 anchored as at 37 to a support 38 at a fixed distance from the thermostat anchor 31. A rod 39 having a handle 40 slips loosely through the support 38 and may be secured into adjusted position thereto by means of a set screw 41. The end of the rod 39 is bent laterally and is perforated, to receive freely the spring 36. By moving the lateral bend 43 of the rod 39 toward the link 33, the free length of the spring is shortened and its resistance thereby increased. In this modification with increased temperature the bimetallic thermostat element 30 tends to separate its ends 31 and 32 and this is resisted by the spring 36 until the latter is bent out of the way at which time the accumulated energy in the thermostat snaps the link 33 forward to the right as shown in the figure, giving a very powerful blow to the lower pivoted end of the lever 35. Upon cooling, the small central depending lug 33$^a$ on the link 33 presses against the right hand side of spring 36 and finally snaps into position, this leaving the parts as shown in this figure.

In Figure 3 the free end of the temperature responsive element engages a rib or projection in the spring 51 anchored with respect to the iron body, as is the thermostat element 52. A screw 54 having a threaded engagement with respect to the iron body may be adjusted at will, by the knurled head 55 projecting within easy reach of the operator. By turning the head 55, a greater or less resistance can be made to the movement of the free end of the thermostat plate 52 with a consequent increase in temperature range if the two sides of the cusp or bend in the spring are the same. It is desired, however, that the minimum temperature, i. e., that at which the circuit is again closed, shall not be lowered and consequently it is preferred that the spring shall be as shown in the figure, that is the rib or bend shall not be symmetrical but shall have a gentle slope 58, and an almost horizontal portion 59 which forms a shoulder or seat. With such a spring a heavy resistance is offered to the movement of the thermostat to break the circuit and a very slight or almost negligible resistance is offered to movement of the thermostat plate to close the circuit, thus minimizing the increase in range by keeping the lower temperature constant. By such means the operator may keep a low maximum temperature when ironing handkerchiefs and by a mere turning of the knurled head 55 may obtain a high maximum temperature when later ironing thick garments.

In Figure 4 the bar 60 is anchored at one end to the support 12 but the other end is not free to bend laterally at the end being fitted loosely thru a guide 61 fixed with respect to the supports 12 and 20$^a$. The spring 22$^a$ engages the end of the bar 60 and the top of the screw 21$^a$ so the resistance or pressure can be regulated as in the other forms. In this modification the longitudinal expansion of the bar compresses the strong spring 22ᵃ and at a definite point the bar suddenly bends centrally, and the force stored in the spring is exerted to snap the center electrode 15a into contact making position.

It is obvious that the contacting surface having the two different angles to the line of movement may be on either the adjustable member as shown in Figure 3 or on the temperature responsive member as shown in Figure 1.

What I claim is:—

1. In a thermostat, a bimetallic temperature responsive member anchored at one end, yielding means pressing against the member and offering resistance to movement of the free end of said member in one lateral direction and offering less resistance to movement of said free end in the opposite direction.

2. The device of claim 1 in which the pressure of the yielding means is adjustable.

3. In a thermostat, a temperature responsive member, a spring pressed pin yieldingly holding the temperature responsive member from normal movement, the cooperating surfaces of the pin and member being such that the holding force is greater against one direction of normal movement than against the other, and means for altering at will the spring tension.

4. In a thermostat, a temperature responsive member, a spring pressed pin yieldingly holding the temperature responsive member from normal movement, means for altering at will the spring tension, and manual means for withdrawing the pin from contact with the temperature responsive member.

5. In a thermostat, a temperature responsive element anchored at one end, spring means opposing movement of the free end of said element, the spring means being so shaped as to offer greater opposing force to movement of the said end in one direction than in the other, means for adjusting the resistance offered by said spring means, a member carried by said element and a second member fixed with respect to the anchored end so as to lie in the path of said member, one of said members being resilient.

6. In a thermostat, a temperature responsive member, a spring pressed pin substantially parallel to said member, and yieldingly holding said member from normal movement, and means for altering at will the spring tension.

7. In a thermostat, a temperature responsive member, a spring pressed pin yieldingly holding the temperature responsive member from normal movement, a projecting end on said pin for manually withdrawing it from contact with the temperature responsive member, and means for altering at will the spring tension, said means surrounding and guiding the pin.

In testimony whereof I affix my signature.

WALTER O. SNELLING.